(12) United States Patent
Klein et al.

(10) Patent No.: US 9,037,912 B1
(45) Date of Patent: May 19, 2015

(54) VALIDATION OF ASSET DATA FOR COMPONENT ASSEMBLIES

(75) Inventors: Matthew D. Klein, Seattle, WA (US); Michael David Marr, Monroe, WA (US)

(73) Assignee: Amazon Technologies, Inc., Seattle, WA (US)

( * ) Notice: Subject to any disclaimer, the term of this patent is extended or adjusted under 35 U.S.C. 154(b) by 212 days.

(21) Appl. No.: 13/592,468

(22) Filed: Aug. 23, 2012

(51) Int. Cl.
  *G06F 11/22* (2006.01)
  *G06F 15/177* (2006.01)
  *G06Q 10/08* (2012.01)
(52) U.S. Cl.
  CPC .................................. *G06Q 10/087* (2013.01)
(58) Field of Classification Search
  USPC ......... 714/36; 705/28, 29, 26.5; 717/170, 171
  See application file for complete search history.

(56) References Cited

U.S. PATENT DOCUMENTS

| | | | | |
|---|---|---|---|---|
| 5,950,011 A * | 9/1999 | Albrecht et al. | ............... | 717/167 |
| 6,889,202 B2 * | 5/2005 | Johnson et al. | .............. | 705/26.5 |
| 7,080,371 B1 * | 7/2006 | Arnaiz et al. | .................. | 717/170 |
| 7,555,683 B2 * | 6/2009 | Gronemeyer et al. | .......... | 714/55 |
| 7,797,697 B2 * | 9/2010 | Woollen et al. | ................ | 717/170 |
| 8,065,397 B2 * | 11/2011 | Taylor et al. | .................. | 709/220 |
| 8,121,908 B2 * | 2/2012 | Oney et al. | ...................... | 705/28 |
| 8,700,888 B2 * | 4/2014 | Tukol et al. | ....................... | 713/2 |
| 2002/0087432 A1 * | 7/2002 | Muniz | ............................. | 705/27 |
| 2002/0107809 A1 * | 8/2002 | Biddle et al. | ..................... | 705/59 |
| 2004/0093109 A1 * | 5/2004 | O'Connor et al. | ........... | 700/117 |
| 2007/0100977 A1 * | 5/2007 | Barry | ............................ | 709/223 |

* cited by examiner

*Primary Examiner* — Joseph Schell
(74) *Attorney, Agent, or Firm* — Thomas|Horstemeyer, LLP

(57) ABSTRACT

Disclosed are various embodiments of a computing device for acquiring a shipment manifest for a component assembly, the shipment manifest including expected asset data associated with the component assembly and a component of the component assembly. The computing device serves, via a network interface, a boot image executable by the component of the component assembly, the component including a processor. Empirical asset data associated with the component is obtained, via the network, by the computing device, the empirical asset data being supplied by the boot image. The computing device determines a validation response for the component assembly based at least upon a comparison of the empirical asset data with expected asset data.

26 Claims, 7 Drawing Sheets

VALIDATION OF ASSET DATA FOR COMPONENT ASSEMBLIES

BACKGROUND

In an age of information and ubiquitous computing, computing equipment organized in data centers is often used to deliver the services and information relied upon. The data centers may receive equipment racks installed and pre-configured with various servers, network switches, network routers, and/or other types of computing devices. The racks and the computing devices within the racks may be ordered in a specific configuration. Racks that are configured differently than expected may create numerous problems as a result of the misconfiguration.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

This disclosure describes various embodiments for validating the configuration of assemblies of networked components, such as racks of computing devices. For example, data centers may receive equipment racks installed and pre-configured with various servers, network switches, network routers, and/or other types of computing devices. The racks and the computing devices within the racks may be ordered in a specific configuration.

Technicians in such data centers may use a handheld device or other computing device, portable or otherwise, in order to validate that the configuration of the component assemblies is as expected. The computing device may be used to display information about equipment that is expected to be delivered to the data center based upon identifiers for each component assembly. In addition, a technician may connect the computing device to one or more networks of the component assembly in order to obtain various configuration data. If inconsistencies are identified between the expected configuration and the present configuration, an exception process may be initiated. Otherwise, the technician may be notified that the component assembly has been successfully validated.

Figure 1:
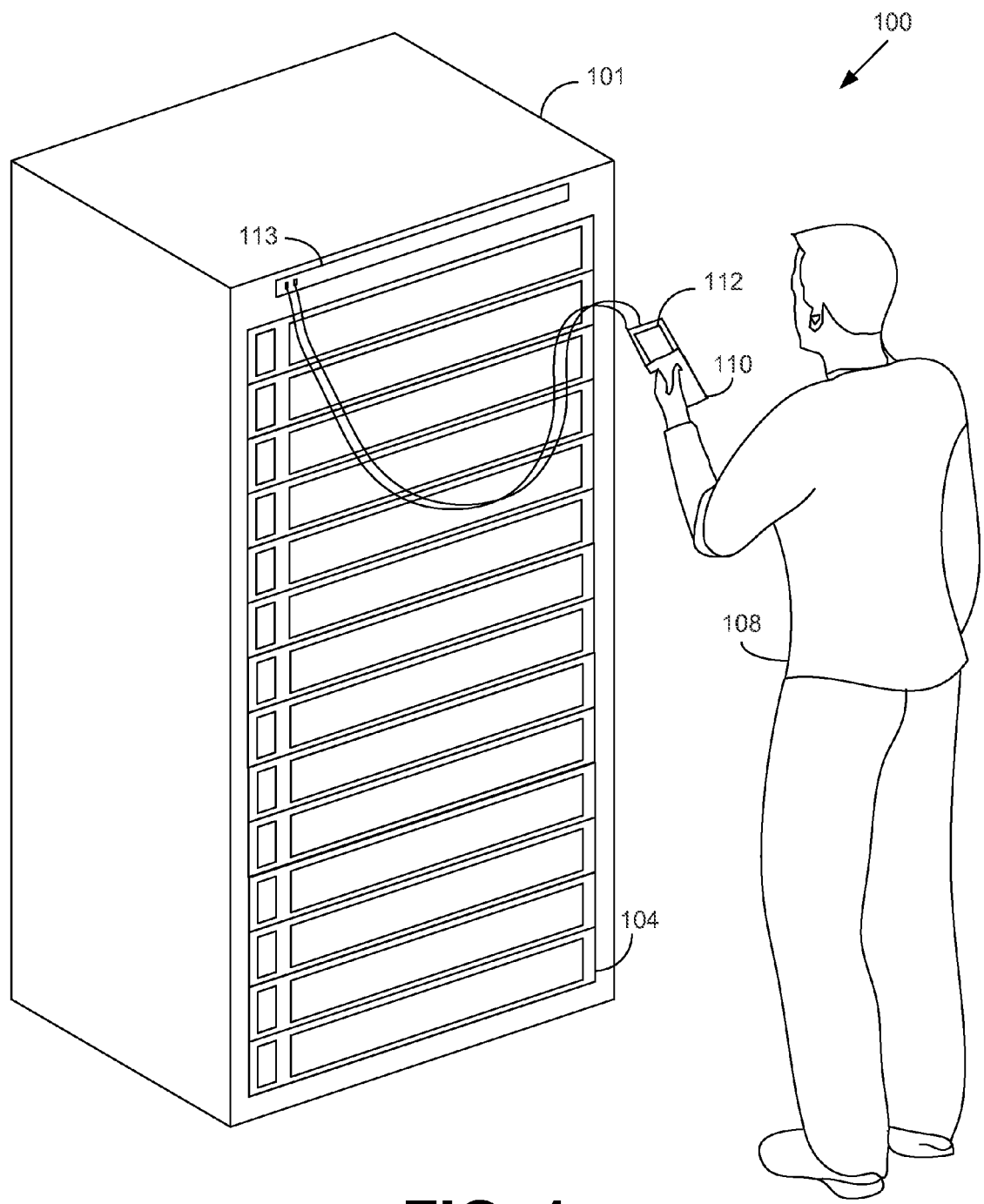
FIG. 1 is a drawing illustrating a data center environment in which technicians validate the configuration of component assemblies.

FIG. 1 shows an example environment 100 in which these techniques may be implemented. The example environment 100 may comprise a data center or other physical installation in which multiple computer equipment, resources, assemblies, and/or components are received and installed on an ongoing basis. A physical installation such as this may house multiple components or resources, such as computers, telecommunications devices, networking components, power supplies, cooling equipment, and so forth. The equipment may be housed in rows or grids of similar or identical equipment racks, and the equipment racks themselves may be considered to be resources. The data center may be housed in a room, a building, or a compound that includes multiple buildings.

The example of FIG. 1 shows a single equipment rack 101 as an example of a component assembly or housing that may be used in a data center. The equipment rack 101 may contain multiple individual components 104 and/or other sub-components. The components 104 may be interconnected and connected to the equipment rack 101 using various cables in order to support network connectivity, console connectivity, electrical power, and/or other services. Both the equipment rack 101 and its components 104 may be visually and/or electronically labeled with various identifiers.

The data center may be staffed by one or more technicians 108, or other support personnel. The technicians 108 may use a handheld or other computing device 110 to assist in performing various diagnostic, informational, and administrative tasks. The computing device 110 may be a general-purpose device, such as a laptop computer, personal digital assistant (PDA), tablet computer, slate computer, smartphone, or a non-portable computing device (for example, a workstation or purpose-built stationary appliance located near the data center loading dock) upon which applications may be installed and executed. The computing device 110 may comprise a display 112, a printer, and/or other type of interface device for communicating with the technicians 108.

The computing device 110 may be capable of investigating and/or interrogating portions of the configuration of the equipment rack 101 and/or component 104 through the use of one or more interfaces for a network 113. In some embodiments, the network 113 may be partitioned into distinct networks serving different roles, such as for operational data communications and management of the component 104. In some embodiments, the computing device 110 may be capable of executing a web browser or other client application, and may communicate wirelessly with various network-accessible resources and management components.

FIG. 1 is intended to depict a scenario in which the equipment rack 101 has been physically delivered to a data center and is in the receiving process, prior to installation within the data center. Generally, the receiving process comprises verifying the integrity of the received equipment, verifying that the equipment is configured as specified by purchasing documentation, and logging the physical receipt and acceptance of the equipment. If the equipment is undamaged and configured as expected, the equipment may be accepted. Otherwise, the equipment may be refused, or some type of remediation or exception process may be initiated. In the following discussion, a general description of the system and its components is provided, followed by a discussion of the operation of the same.

Figure 2A:
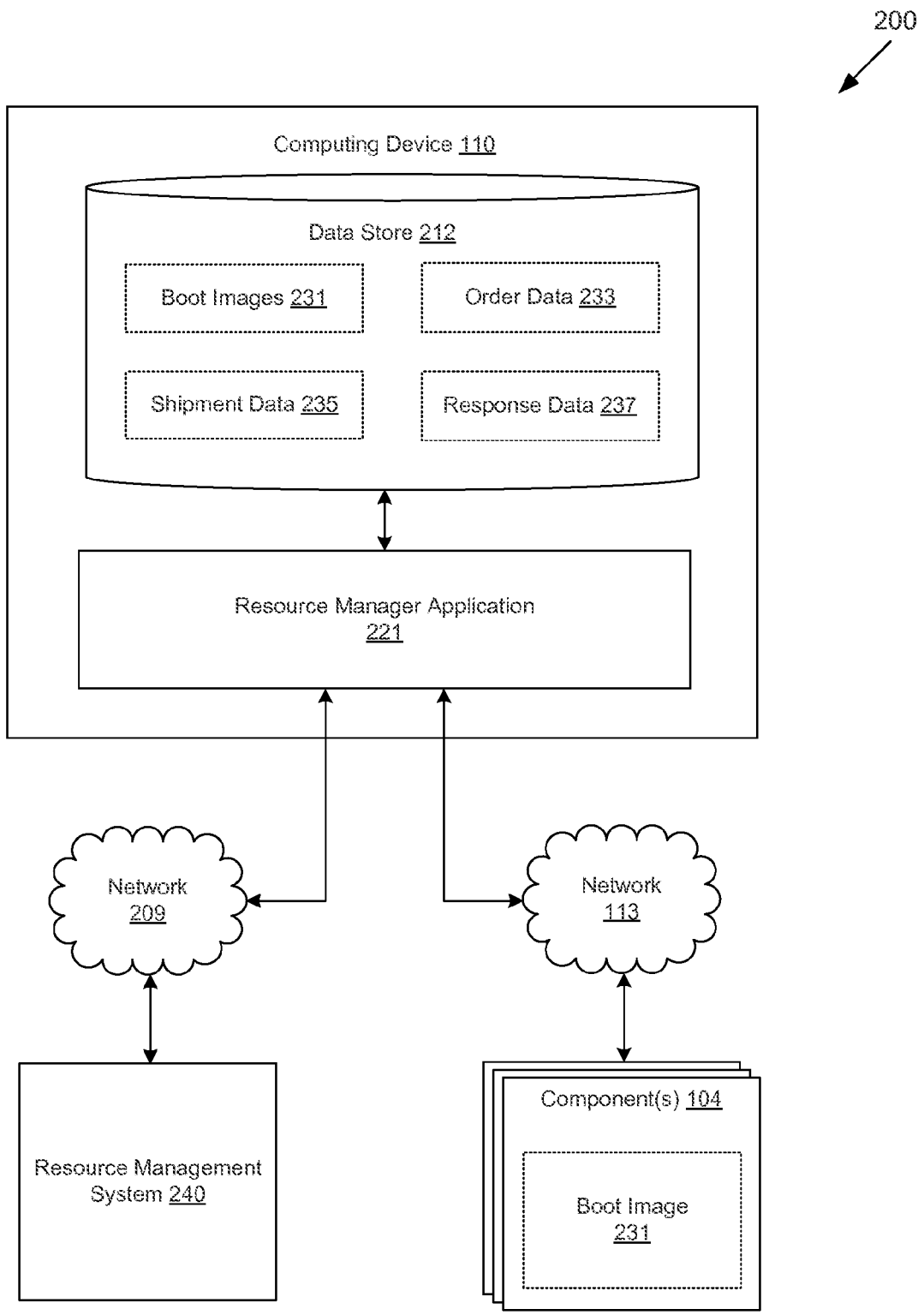
FIGS. 2A and 2B are drawings of a networked environment according to various embodiments of the present disclosure.

Referring next to FIG. 2A, shown is a networked environment 200 according to various embodiments. The networked environment 200 includes a computing device 110 in data communication via a network 113 (FIG. 1). The network 113 includes, for example, local area networks (LANs), wired networks, wireless networks, or other suitable networks, etc., or any combination of two or more such networks that may be present in a component assembly such as the equipment rack 101 (FIG. 1). In some embodiments, the computing device 110 may further be in data communication via a second network 209. The network 209 includes, for example, the Internet, intranets, extranets, wide area networks (WANs), local area networks (LANs), wired networks, wireless networks, or other suitable networks, etc., or any combination of two or more such networks.

The computing device 110 may comprise, for example, a processor-based system such as a computer system. Such a computer system may be embodied in the form of a laptop computer, PDA, tablet computer, slate computer, smartphone, or other devices with like capability. The display 112 (FIG. 1) may comprise, for example, one or more devices such as liquid crystal display (LCD) displays, gas plasma-based flat panel displays, organic light emitting diode (OLED) displays, LCD projectors, or other types of display devices, etc. The display 112 may be integrated into a common housing with the computing device 110, or may be a separate device such as a workstation display. Likewise, a printing mechanism may be included in the computing device 110 as an integrated component, or as a separate device.

Various applications and/or other functionality may be executed in the computing device 110 according to various embodiments. Also, various data is stored in a data store 212 that is accessible to the computing device 110. The data store 212 may be representative of a plurality of data stores 212 as can be appreciated. The data stored in the data store 212, for example, is associated with the operation of the various applications and/or functional entities described below. In some embodiments, a portion of the data store 212 may function as a cache or other auxiliary storage for another data store remote to the computing device 110.

The components executed on the computing device 110, for example, include a resource manager application 221, and other applications, services, processes, systems, engines, or functionality not discussed in detail herein. The resource manager application 221 is executed to facilitate the validation of the configuration of the one or more components 104 within a component assembly such as the equipment rack 101. The configuration items determinable by the resource manager application 221 may include, for example, asset identifiers, serial numbers, media access control (MAC) addresses, computing hardware resources installed, ports used for network cables, and/or other configuration data associated with the components 104. In some embodiments, the resource manager application 221 may be executed within a virtual machine, the virtual machine being executable by one or more processors of the computing device 110.

The data stored in the data store 212 includes, for example, boot images 231, order data 233, shipment data 235, response data 237, and potentially other data. In some embodiments, the data stored in the data store 212 may represent a portion of the respective boot images 231, order data 233, shipment data 235, response data 237, and potentially other data available through a resource management system 240. In various embodiments, portions of the data from the resource management system 240 may be stored in the data store 212 on a space available, "on-demand," "as-needed," and/or other basis as can be appreciated.

The boot images 231 may include one or more operating systems for execution in the various components 104. The boot images 231 may be configured to generate an inventory of various configuration data associated with the components 104 and report the configuration data to the resource manager application 221. The order data 233 may indicate specific component assemblies, such as equipment racks 101 that are expected to be received, as well as characteristics of the expected component assemblies. Such characteristics may include specifications, identifications, and/or various other configuration data associated with the components 104 that are expected to be included in the component assemblies. As a non-limiting example, the order data 233 may comprise asset identifiers, serial numbers, MAC addresses, computing hardware resources installed, ports used for network cables, and/or other configuration data (e.g., firmware revisions or settings) associated with the components 104 and component assembly.

The shipment data 235 may include specifications, identifications, and/or various other configuration data associated with the components 104 that are discovered and/or obtained by the resource manager application 221. As a non-limiting example, the shipment data 235 may comprise asset identifiers, serial numbers, MAC addresses, computing hardware resources installed, ports used for network cables, and/or other configuration data (e.g., firmware revisions or settings) associated with the components 104 and component assembly.

The response data 237 may include a log of the discrepancies in the configuration data for the components 104 and a responsive action to be taken for the component 104 and/or the associated component assembly. The discrepancies may arise from differences between the expected configuration provided in the order data 233 and the empirical or "actual" observed configuration of the shipment data 235. In some embodiments, the response data 237 may further comprise one or more discrepancy thresholds for each component 104 and/or for the component assembly. In other embodiments, each type of discrepancy may be weighted in relation to the perceived significance and/or ability to be remediated.

The component 104 is representative of one or more computing devices that may comprise, for example, a server computer, a network router, a network switch, and/or any other system providing computing capability. Within the environment 100, one or more of the components 104 may be configured and arranged in a component assembly such as an equipment rack 101.

The components 104 may be configured to request an initial program load typically associated with a "boot" process via the network 113 and/or via a storage device. Each component 104 may use the boot process to begin executing an operating system that may be provided as a boot image 231. The components 104 may be configured to execute applications beyond the operating system such as, for example, diagnostic and/or test script applications, browsers, mobile applications, email applications, social networking applications, and/or other applications.

Next, a general description of the operation of the various components of the networked environment 200 is provided. To begin, one or more components 104 have been installed within a component assembly such as an equipment rack 101. The installation may comprise physical installation of the components 104 within the component assembly, as well attachment of various cables used to provide the components 104 with connectivity to the network 113, console or management capability, electrical power, and/or other possible services or devices.

Details of the installation of the components 104 within the component assembly may be specified within the order data 233. The order data 233 may comprise identifiers for specific component assemblies, such as equipment racks 101 that are expected to be received, as well as characteristics of the expected component assemblies. Such characteristics may include specifications, identifications, and/or various other configuration data associated with the components 104 that are expected to be included in the component assemblies.

As a non-limiting example, the order data 233 may specify that equipment rack with an identifier of 15A12345 should comprise a model NSX network switch having serial number NS67890 and a model SX server having serial number S09876. The order data 233 may further specify that the server should have two network interfaces having MAC addresses 00-12-34-56-78-90 and 00-12-34-56-78-91 which are connected to ports one and two of the network switch, respectively.

Given a component assembly and order data 233, the resource manager application 221 may begin validating the configuration of the components 104 within the component assembly. To this end, electrical power may be provided to the component assembly, in order to provide electrical power to the components 104. Once the components 104 are powered-on, they may begin execution of one of the boot images 231 corresponding to the particular type of component 104. In some embodiments, the resource manager application 221 may deliver the boot images 231 via the network 113 using various possible protocols such as pre-boot execution environment (PXE), trivial file transfer protocol (TFTP), dynamic host configuration protocol (DHCP), bootstrap protocol (BOOTP), and/or other data communication protocols as can be appreciated. In other embodiments, the boot images 231 may be delivered using a storage device such as magnetic hard drives, memory cards, solid-state drives, USB flash drives, optical discs, and/or other types of storage devices.

The particular boot image 231 suitable for a particular component 104 may be determined by the resource manager application 221 on the basis of identifying characteristics of the particular component 104. For example, it may be known that model SX servers should be given a particular boot image 231. If the model SX server attempts to obtain a boot image 231 via the network 113, the resource manager application 221 may distinguish requests from model SX servers from other device requests based upon the MAC addresses associated with model SX.

Once the boot images 231 begin executing in the various components 104, the boot images 231 may report the configuration data associated with the components 104 such as, for example, asset identifiers, serial numbers, MAC addresses, computing hardware resources installed, ports used for network cables, and/or other configuration data associated with the components 104 and component assembly. This configuration data may be obtained for the components 104 by the respective boot images 231 using various hardware scanning and interrogation techniques as can be appreciated. The configuration data may be transmitted via the network 113 back to the resource manager application 221 using hypertext transfer protocol (HTTP), file transfer protocol (FTP), transmission control protocol (TCP), user datagram protocol (UDP), and/or various other data communication protocols. The configuration data obtained from each component 104 may be stored as shipment data 235.

In some embodiments, the resource manager application 221 may also directly interrogate the components 104 to obtain the configuration data. As a non-limiting example, one of the components 104 may be a network switch to which various other components such as servers are connected via network cables to form the network 113. In this example, the resource manager application 221 may provide a boot image 231 for the network switch that does not actively collect configuration data about the network switch. Instead, the boot image 231 may passively enable scanning or interrogation of the configuration data of network switch by the resource manager application 221. The resource manager application 221 may obtain the configuration data via simple network management protocol (SNMP), interacting with a command-line interface (CLI) of the network switch using secure shell (SSH), telnet, rlogin, and/or other data communication protocol. The configuration data obtained from each component 104 may be stored as shipment data 235.

For each component 104 for which configuration data is received in the shipment data 235, the resource manager application 221 may begin comparing the shipment data 235 to the corresponding order data 233 for the component. Any discrepancy between the expected order data 233 and the empirical shipment data 235 for the component 104 may be logged in the response data 237. The resource manager application 221 may continue to collect or attempt to collect configuration data from each of the components 104 until configuration data from all of the expected components 104 has been received, until a timeout occurs, or other possible events. Components 104 having been expected, but not discovered, as well as components discovered but not expected may each be included in the response data 237 as a discrepancy.

Based upon the response data 237 generated, the resource manager 221 application may determine a response for the component assembly and/or each individual component 104 based upon discrepancies identified. In some embodiments, the response data 237 may further comprise one or more discrepancy thresholds for each component 104 and/or for the component assembly. For example, if a discrepancy is discovered with one of a plurality of components 104 of a component assembly, a discrepancy threshold may indicate that the responsive action should be to accept delivery and perform on-site remediation of the problem. However, if discrepancies exist for half of the components 104 of a component assembly, the discrepancy threshold may indicate that the responsive action should be to reject delivery. In general, the discrepancy threshold can be used to determine an acceptable rate of defects. In other embodiments, there may be a plurality of discrepancy thresholds for different types of components, and accept or reject decisions may be made based on a combination of constraints as appreciated by those of ordinary skill in the art.

In other embodiments, each type of discrepancy may be weighted in relation to the perceived significance and/or ability to be remediated. For example, a network cable for a server plugged into port 2 of a network switch instead of port 1 may have less weight than the server being the wrong model. The various thresholds, weights, preference, and/or other factors influencing the response may be stored in the response data 237 along with the discrepancies identified. Based upon these factors, the resource manager application 221 may determine the response for the component assembly.

In some embodiments, the computing device 110 may indicate the response via the display 112 (FIG. 1) and may permit a user to perform other actions such as provide comments, override the response, see more detailed information, etc. In other embodiments, the computing device may print all or a portion of the response for a user. For example, if a component assembly is refused for shipment, a printed response may be provided to the supplier detailing the reasons for refusal.

Figure 2B:
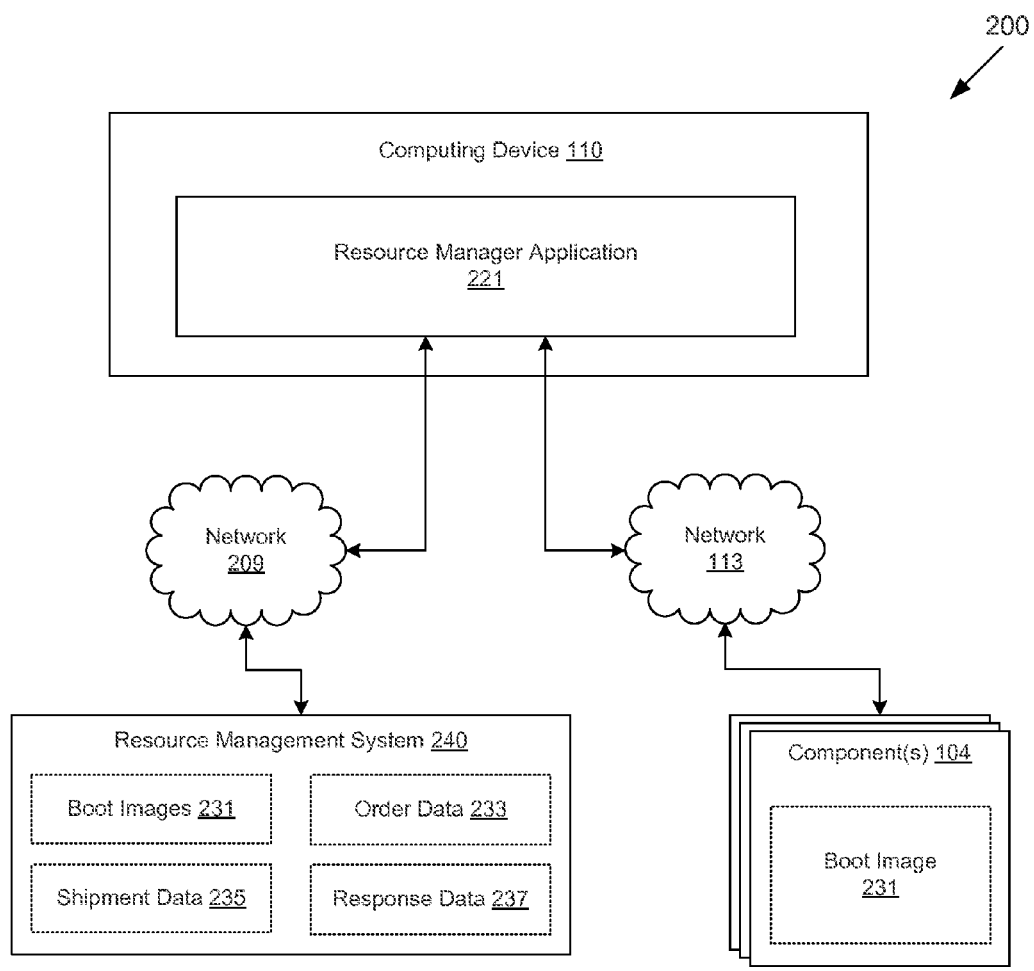

Turning now to FIG. 2B, shown are other embodiments of the networked environment 200. In these embodiments, the boot images 231, order data 233, shipment data 235, response data 237, and/or other data of the data store 212 (FIG. 2A) may be stored in the resource management system 240. The operations of validating the configuration of the components 104 within the component assembly previously described in association with the resource manager application 221 of FIG. 2A may be performed by the resource management system 240. As a non-limiting example, the operations may include delivering boot images 231 to the components 104, collecting configuration data reported by the boot images 231, interrogating the components 104 to determine configuration data, comparing configuration data of the components 104 to the order data 233, determining a response for the components 104, and/or other operations described previously.

In these embodiments, the resource manager application 221 executing in the computing device 110 may render a user interface for the resource management system 240 and/or other computing devices accessible via the network 209. To this end, the resource manager application 221 may be a browser and/or other application capable of rendering a user interface in the computing device 110. Furthermore, the resource manager application 221 may facilitate the operations between the resource management system 240 and the components 104 by forwarding the data to be exchanged between them across the network 113 and network 209.

Figure 3:
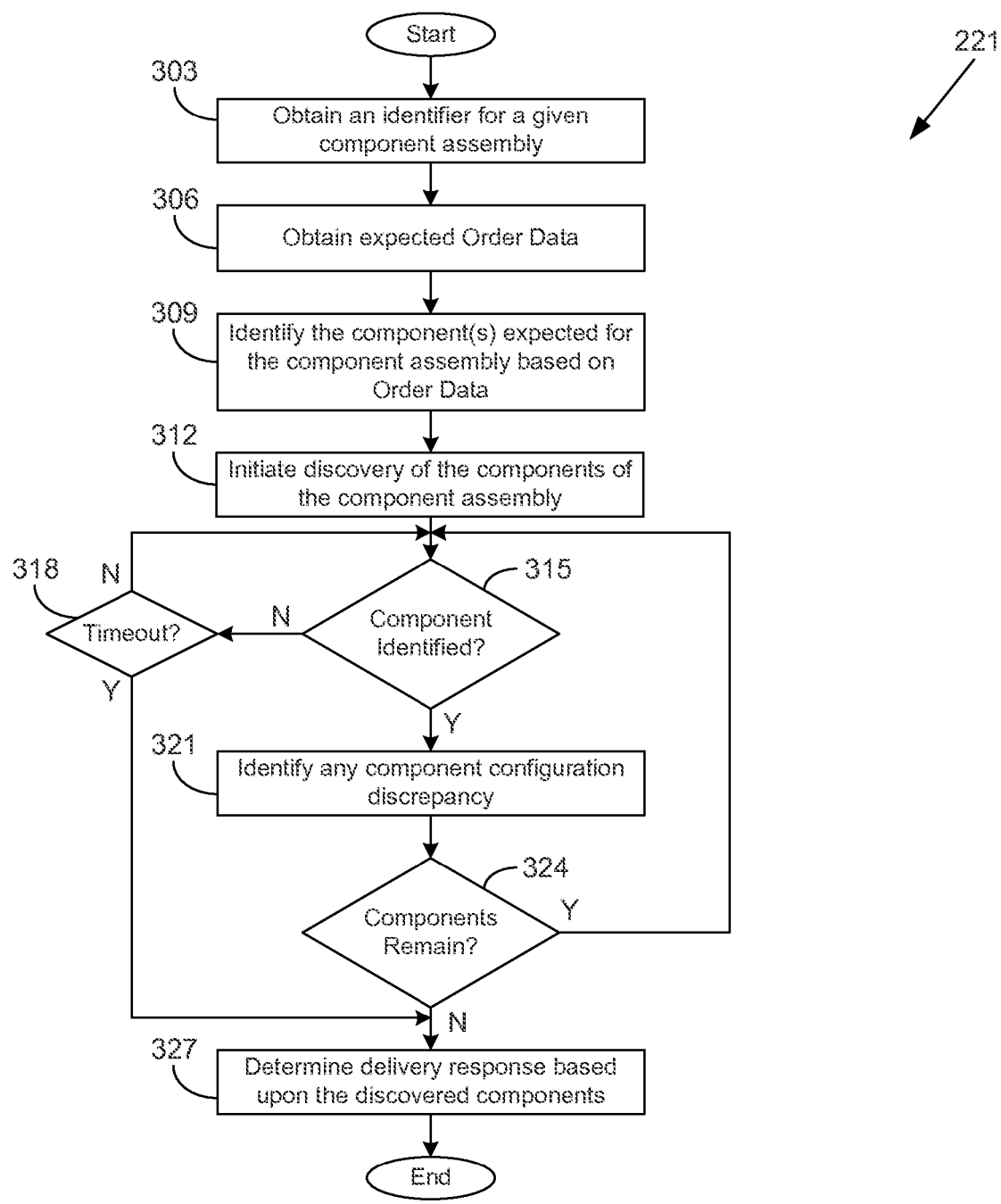
FIG. 3 is a flowchart illustrating one example of functionality implemented as portions of a resource manager application executed in a computing environment in the networked environment of FIGS. 2A and 2B according to various embodiments of the present disclosure.

Referring next to FIG. 3, shown is a flowchart that provides one example of the operation of a portion of the resource manager application 221 according to various embodiments. It is understood that the flowchart of FIG. 3 provides merely an example of the many different types of functional arrangements that may be employed to implement the operation of the portion of the resource manager application 221 as described herein. As an alternative, the flowchart of FIG. 3 may be viewed as depicting an example of steps of a method implemented in the computing device 110 (FIG. 1) according to one or more embodiments.

This portion of the resource manager application 221 may be initiated based upon obtaining a component assembly for configuration validation. Beginning with block 303, the resource manager application 221 may obtain an identifier for the particular component assembly to be validated. The component assembly may be identified by entry of an identifier by a user, scanning a bar code, scanning a radio frequency identification (RFID) tag, and/or other possible techniques.

Next, in block 306, the resource manager application 221 may obtain the order data 233 (FIG. 1) comprising data associated with the component assembly to be validated. As described previously, the order data 233 may be obtained from, for example, the local data store 212 (FIG. 2A) and/or from the resource management system 240 (FIG. 2A). The order data 233 may comprise identifiers for specific component assemblies, such as equipment racks 101, that are expected to be received, as well as characteristics of the expected component assemblies. Then, in block 309, the resource manager application 221 may identify the components 104 (FIG. 1) expected for the particular component assembly. Based upon the expected components 104 for a given component assembly, the resource manager application 221 may determine the particular boot image 231 (FIG. 2A) suitable for a particular component 104. As described previously, the boot images 231 may be distributed to the components via the network 113 (FIG. 1) and/or via storage devices that may be installed by users.

Continuing, in block 312, the resource manager application 221 may begin the discovery process for configuration data of the components 104. This configuration data may be obtained for the components 104 by the respective boot images 231 and/or directly by the resource manager application 221 as described previously. Next, in block 315, the resource manager application 221 determines if a component 104 has been identified. If not, in block 318 the resource manager application 221 determines if a timeout has occurred waiting for the next component identification. If a timeout has not occurred execution returns to block 315. Alternatively, if a timeout has occurred, execution of the resource manager application 221 proceeds to block 327.

Returning to block 315, if the resource manager application 221 has identified configuration data for a component 104, then, in block 321, the configuration data is examined to determine any discrepancies. The discrepancies may include any deviation between the expected component 104 as specified in the order data 233 and the empirical configuration of the component 104 as observed. Next, in block 324, the resource manager application 221 determines whether any further components 104 are expected for the given component assembly. If additional components 104 are expected, execution of the resource manager application 221 returns to block 315. Alternatively, if no further components 104 are expected, in block 327, the resource manager application 221 determines a response based at least upon the discrepancies identified. Thereafter, this portion of the execution of the resource manager application ends as shown.

FIGS. 4-7 illustrate examples of instructing the technician 108 (FIG. 1) in the context described above. Actual embodiments of the resource manager application 221 (FIG. 1) executing in the computing device 110 (FIG. 1) may provide varying levels of instruction specificity or granularity, at various different points in the validation process. Furthermore, while these figures illustrate the instructions being output on a display 112 of the computing device 110, in other instances some or all of the instructions may additionally or alternatively be output audibly through a speaker and/or tangibly on a printed page.

Figure 4:
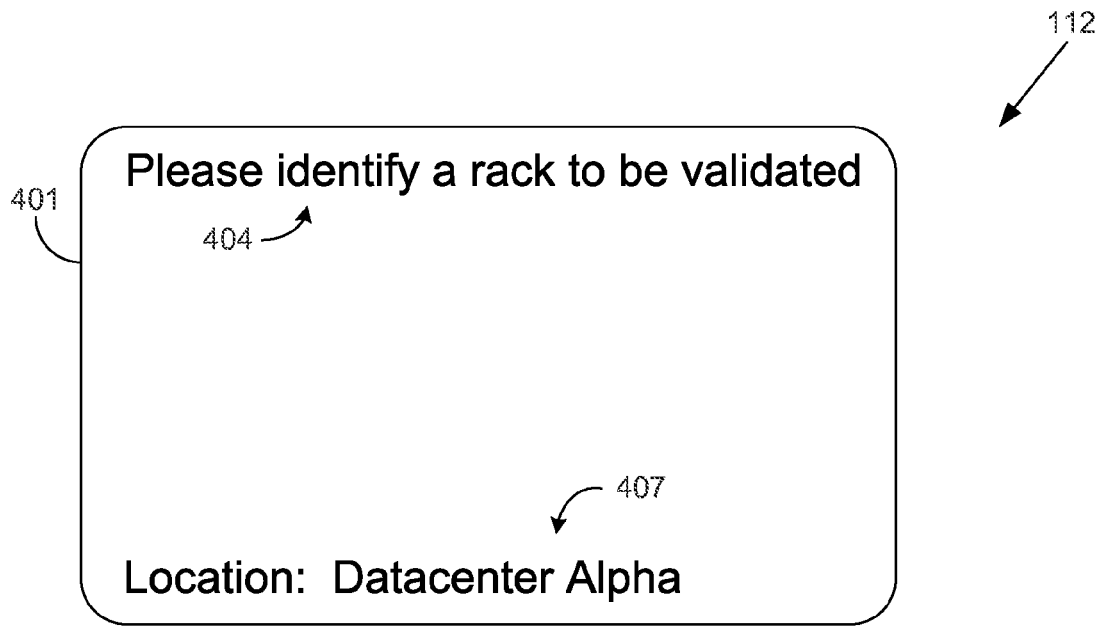
FIGS. 4-7 are drawings of example user interfaces rendered by a computing device in the networked environment of FIGS. 2A and 2B according to various embodiments of the present disclosure.

FIG. 4 shows an example instruction pane 401 that may be displayed to a technician or other support personnel in order to initiate the validation operation. In the described embodiment, the instruction pane 401 may be presented on a display 112 of the computing device 110.

The instruction pane 401 may contain an instruction 404, directing the technician to identify a component assembly to be validated. The instruction pane 401 may also contain a location indicator 407, showing the current location of the technician, which in this example is shown as "Datacenter Alpha."

Figure 5:
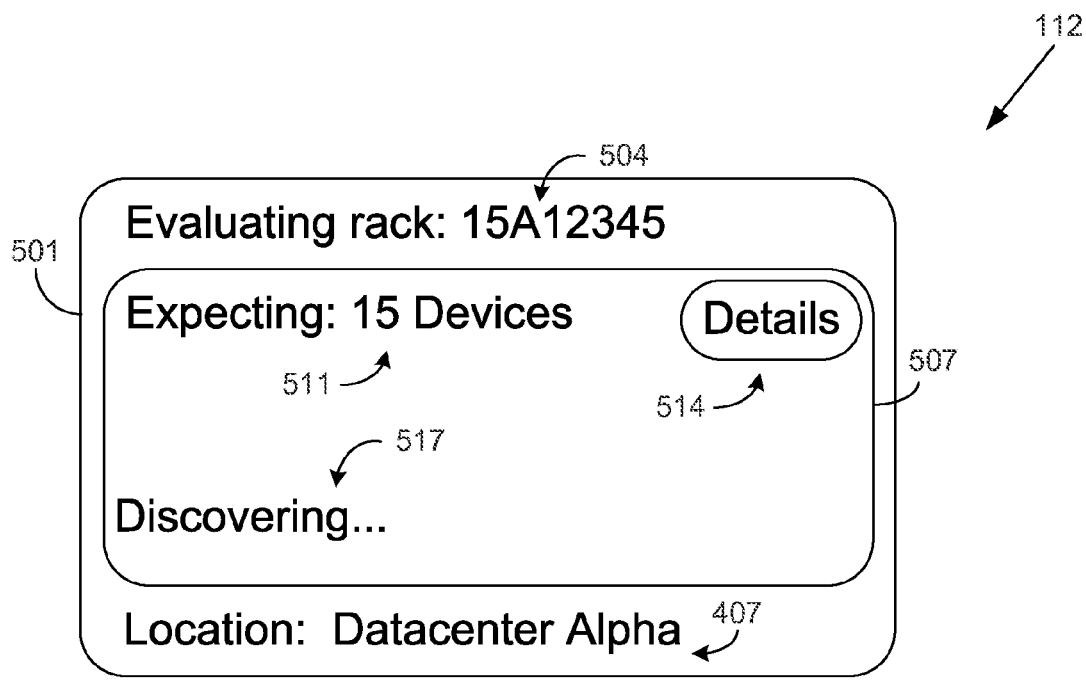

FIG. 5 shows an example instruction pane 501 that might be used after a technician has scanned or identified a particular equipment rack, and has started validating the components 104 (FIG. 1) of the component assembly. The instruction pane 501 may include a status area 504, indicating the current component assembly being validated. In this example, the status area 504 indicates that the technician 108 is in the process of validating an equipment rack having the identifier "15A12345." The instruction pane 501 may also include the location indicator 407 described above.

Additionally, the instruction pane 501 may contain an activity pane 507 describing the current activity of the resource manager application 221. The activity pane 507 may contain an expectation area 511, as well as potentially a details region 514 through which the technician 108 may request further details about the expected components 104. The activity pane 507 may further contain an observation area 517. In this example, the expectation area 511 indicates that 15 devices are expected to be installed within the rack, and the observation area 517 indicates that the device discovery operation in presently underway.

Figure 6:
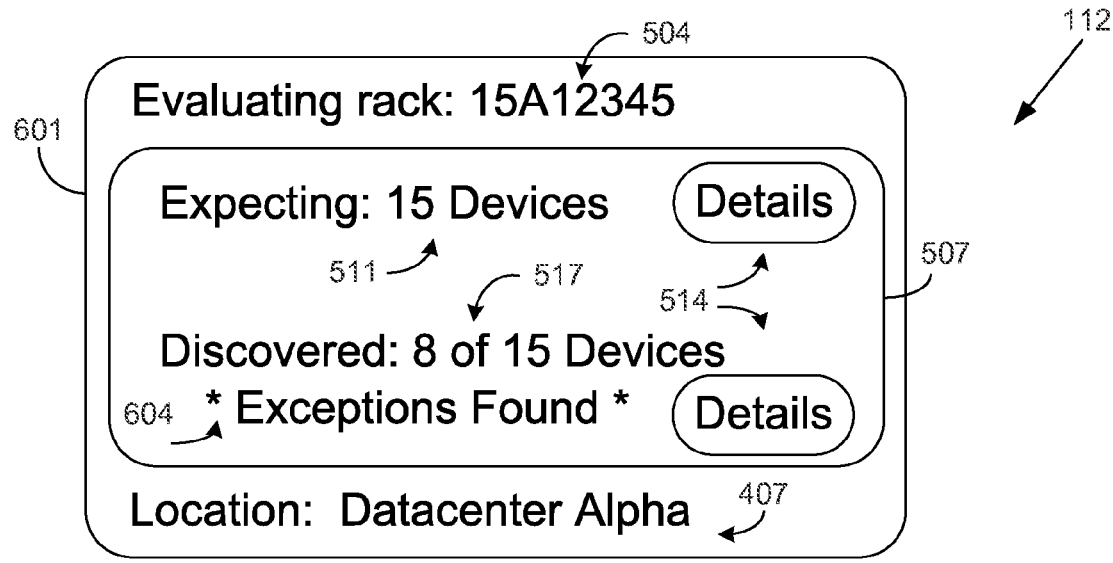

FIG. 6 shows an example instruction pane 601 that might be used after a technician 108 has begun scanning the components of the equipment rack, and configuration data from some of the components has been obtained. The instruction pane 601 may again include the status area 504 indicating the component assembly being validated. The instruction pane 601 may also include the location indicator 407 described above.

Additionally, the instruction pane 601 may again contain the activity pane 507 describing the current activity of the resource manager application 221. The activity pane 507 may again contain an expectation area 511, as well as potentially a details region 514 through which the technician 108 may request further details about the expected components 104. The activity pane 507 may further contain an observation area 517. In this example, the observation area 517 indicates that so far 8 of 15 devices expected to be installed within the rack have been discovered. The exception area 604 may be used to indicate any discrepancies found with the devices discovered thus far. In this example, the exception area 604 displays the message "Exceptions Found" and provides another details region 514 by which a technician 108 may obtain further information about the exception(s).

Figure 7:
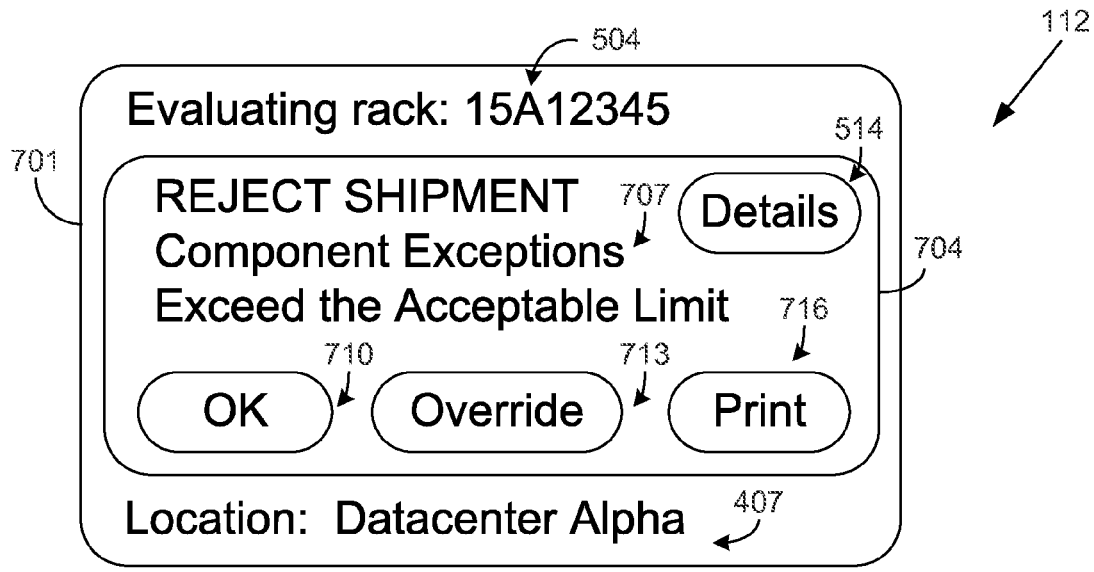

FIG. 7 shows an example instruction pane 701 that might be used after the resource manager application 221 has obtained configuration data from all of the expected components 104, upon a timeout event associated with obtaining the configuration data, or upon the occurrence of other possible events. The instruction pane 701 may again include the status area 504 indicating the component assembly being validated, as well as the location indicator 407.

The instruction pane 701 may contain the response pane 704 describing the response to be taken based upon the discrepancies discovered with the components 104. The response pane 704 may contain a response message area 707, as well as potentially a details region 514 through which the technician 108 may request further details about the response. In this example, the response message area 707 indicates that the equipment rack should be rejected due to the discrepancies exceeding a pre-defined threshold. The response pane 704 may also contain a confirmation region 710 through which a technician may confirm the response to be taken for the component assembly. In some embodiments, the response pane 704 may contain an override region 713 through which a technician 108 may override the response determined by the resource manager application 221. In other embodiments, the response pane 704 may contain a print region 716 through which a technician 108 may print a report of the results and/or discrepancies as determined by the resource manager application 221. The report may be printed by a printing device integrated within or attached to the computing device 110, or by a remote printing device accessible via a network.

Figure 8:
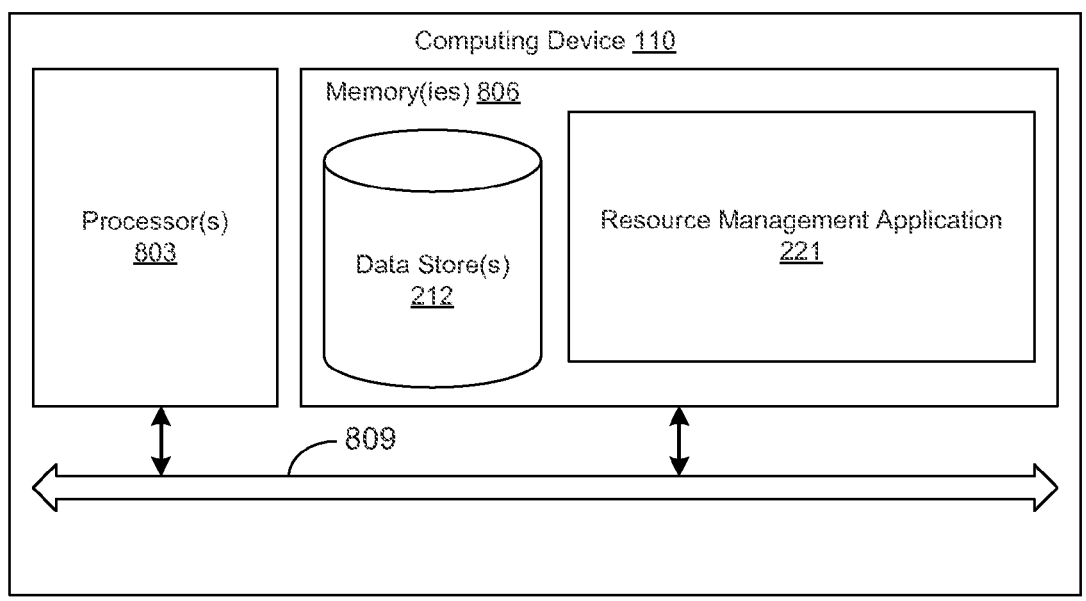
FIG. 8 is a schematic block diagram that provides one example illustration of a computing device employed in the networked environment of FIGS. 2A and 2B according to various embodiments of the present disclosure.

With reference to FIG. 8, shown is a schematic block diagram of the computing device 110 according to an embodiment of the present disclosure. The computing device 110 includes at least one processor circuit, for example, having a processor 803 and a memory 806, both of which are coupled to a local interface 809. To this end, each computing device 110 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the resource manager application 221, and potentially other applications. Also stored in the memory 806 may be a data store 212 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the resource manager application 221, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the resource manager application 221. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the resource manager application 221, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, comprising:
   code that acquires a shipment manifest for a component assembly, the shipment manifest specifying expected asset data associated with the component assembly and a component of the component assembly;
   code that serves, via a network interface of the computing device, a boot image executable by the component of the component assembly, the boot image comprising a plurality of diagnostic tests;
   code that obtains, via the network interface of the computing device, empirical asset data associated with the component, the empirical asset data being supplied by the boot image and comprising a network identifier of the component;
   code that obtains, via a console interface of the computing device, further empirical asset data comprising a console configuration of the component;
   code that determines a delivery response for the component assembly based at least in part upon a comparison of the empirical asset data with the expected asset data; and
   code that generates a report of the comparison of the empirical asset data and the expected asset data.

2. The non-transitory computer-readable medium of claim 1, wherein the program is executable in a virtual machine, the virtual machine executable in the computing device.

3. The non-transitory computer-readable medium of claim 1, wherein the program further comprises code that generates a notice to a user of the computing device in response to a discrepancy specified by the report.

4. A computing device, comprising:
   a processor circuit having at least one processor and a memory;
   a network interface; and
   a resource manager executable by the at least one processor, the resource manager comprising:
      logic that supplies a boot image executable by a component of a component assembly, the boot image being supplied to the component via the network interface;
      logic that obtains empirical asset data associated with the component, the empirical asset data being supplied by the boot image; and
      logic that determines a validation response for the component assembly based at least in part upon a comparison of the empirical asset data with expected asset data associated with an invoice for the component assembly.

5. The computing device of claim 4, wherein the comparison is performed prior to an installation of the component assembly.

6. The computing device of claim 4, further comprising a virtual machine executable by the at least one processor, the resource manager being executable by the virtual machine.

7. The computing device of claim 6, wherein the virtual machine is replaced according to a schedule.

8. The computing device of claim 4, wherein the component assembly is one of a plurality of component assemblies selected based at least in part upon a statistical sampling of the component assemblies.

9. The computing device of claim 4, wherein the validation response is further based at least in part upon the comparison meeting at least one pre-defined component threshold, the at least one pre-defined component threshold being associated with a subset of the empirical asset data matching the expected asset data.

10. The computing device of claim 4, wherein the resource manager further comprises logic that generates a report of the comparison of the empirical asset data and the expected asset data.

11. The computing device of claim 4, wherein the component assembly comprises an identifier, the identifier identifying the component assembly in the invoice.

12. The computing device of claim 11, wherein the resource manager further comprises logic that generates an exception based at least in part upon the invoice for the component assembly not including the component.

13. A method, comprising:
acquiring, in a computing device, a shipment manifest for a component assembly, the shipment manifest comprising expected asset data associated with the component assembly and a computing device of the component assembly, the computing device comprising a processor;
obtaining, via a first network interface of the computing device, empirical asset data associated with the computing device, the empirical asset data being supplied by a boot image executable by the computing device; and
determining, in the computing device, a delivery response for the component assembly based at least in part upon a comparison of the empirical asset data with the expected asset data.

14. The method of claim 13, the shipment manifest being acquired, via a second network interface of the computing device, from a resource management system, the resource management system storing a plurality of shipment manifests for a plurality of component assemblies.

15. The method of claim 14, further comprising transmitting, in the computing device, an update to the resource management system, the update associated with the delivery response for the component assembly.

16. The method of claim 14, wherein the second network interface is a wireless network interface.

17. The method of claim 13, further comprising obtaining, via a console interface of the computing device, further empirical asset data comprising a console configuration of the computing device.

18. The method of claim 13, wherein the computing device is one of a plurality of computing devices of the component assembly.

19. The method of claim 18, wherein the delivery response is further based at least in part upon a composite comparison meeting a pre-defined assembly threshold, the composite comparison comprising the comparison for each of the computing devices of the component assembly.

20. The method of claim 13, wherein the delivery response is further based at least in part upon the comparison meeting at least one pre-defined component threshold, the at least one pre-defined component threshold being associated with a subset of the empirical asset data matching the expected asset data.

21. The method of claim 13, further comprising generating, in the computing device, a remediation report based at least in part upon a discrepancy between the empirical asset data and the expected asset data.

22. The method of claim 21, further comprising generating, in the computing device, a notice to a user of the computing device in response to the remediation report.

23. A computing device, comprising:
a processor circuit having at least one processor and a memory; and
a resource manager executable by the at least one processor, the resource manager comprising:
logic that obtains, via a first network interface, data encoding a user interface, a portion of the data encoding the user interface being supplied by a resource management system, the resource management system comprising expected asset data associated with a component of a component assembly;
logic that acquires, via a second network interface, empirical asset data associated with the component of the component assembly, the empirical asset data being supplied by a boot image executable by the component;
logic that forwards, via the second network interface, the boot image from the resource management system to the component; and
logic that obtains, via the first network interface, data encoding a validation response in the user interface, the validation response based at least in part upon a comparison of the empirical asset data with the expected asset data.

24. The computing device of claim 23, wherein the resource manager further comprises logic that obtains, via the first network interface, a report of the comparison of the empirical asset data and the expected asset data.

25. The computing device of claim 24, wherein the user interface has a region permitting a user to print the report.

26. The computing device of claim 23, wherein the resource manager further comprises logic that generates, via the first network interface, an exception based at least in part upon an invoice for the component assembly not including the component.

* * * * *